United States Patent [19]

Nelson

[11] Patent Number: 5,385,493
[45] Date of Patent: Jan. 31, 1995

[54] SYSTEM FOR INTRODUCING A LUBRICANT

[76] Inventor: Jerry D. Nelson, 17315 Tobacco Rd., Lutz, Fla. 33549

[21] Appl. No.: 207,885

[22] Filed: Mar. 7, 1994

Related U.S. Application Data

[63] Continuation of Ser. No. 634,016, Dec. 26, 1990, abandoned.

[51] Int. Cl.⁶ ............................................. B63H 5/12
[52] U.S. Cl. .................... 440/63; 74/501.5 R; 184/15.1
[58] Field of Search ............... 440/53, 61, 62, 63, 440/113; 74/501.4–501.6; 114/144 R; 184/15.1, 15.2, 15.3, 105.3

[56] References Cited

U.S. PATENT DOCUMENTS

| | | | |
|---|---|---|---|
| 2,083,937 | 6/1937 | Begg | 184/15.1 |
| 3,143,994 | 8/1964 | Morse | 440/62 |
| 4,415,064 | 11/1983 | Oliemuller | 184/15.1 |
| 4,735,165 | 4/1988 | Baba et al. | 440/62 |
| 4,815,994 | 3/1989 | Hickham, Jr. | 440/62 |

FOREIGN PATENT DOCUMENTS 0746071  5/1933  France ................. 184/15.1

Primary Examiner—Jesûs D. Sotelo
Attorney, Agent, or Firm—A. W. Fisher, III

[57] ABSTRACT

An apparatus and method is disclosed for an improved system for introducing a lubricant into a cable mounting tube of a pivotable outboard motor in response to a motorboat steering cable. The improvement comprises a nut body having an end wall, a plurality of bores, a resilient seal installed in an annular recess in a bore, and a grease fitting communicating with one of the plurality of bores. The invention provides a seal between the cable mounting tube and the steering cable to prevent the intrusion of a foreign matter and provides a pathway for lubricating the cable mounting tube.

14 Claims, 5 Drawing Sheets

SYSTEM FOR INTRODUCING A LUBRICANT

CO-PENDING APPLICATION

This application is a continuation application of pending application Ser. No. 634,016, filed Dec. 26, 1990 now abandoned.

BACKGROUND OF THE INVENTION

1. Field of the Invention

This invention relates to an outboard motor steering system, and more specifically to a system for introducing a lubricant into a steering cable for a pivotable outboard motor.

2. Background of the Invention

The original purpose of an outboard motor was to provide a small portable motor for a rowboat. As the outboard motor evolved, significant improvements were implemented in the output horsepower of the outboard motor. As a consequence of the increase in the output horsepower of the outboard motor the size and weight of the outboard motor increased dramatically. The early outboard motors, as well as many of the present day low horsepower outboard motors, were steered by a manually operated steering tiller. An operator of the outboard motor was position in the stern of the vessel, as is well known to those skilled in the art.

As outboard powered vessels increased in the available horsepower and size, remote engine controls and steering were developed enabling the operator to be positioned forward in the vessel to provide a more unobstructed view for the operator. In addition, the weight distribution in the vessel was improved when the operator was positioned forward in the vessel.

Early steering systems comprised a steering wheel for rotating a cable drum. A flexible steering cable was wrapped about the cable drum near the center of the cable and both ends of the cable were attached to the outboard motor. The cable was guided by a series of pulleys attached to the vessel. Rotating the steering wheel and the cable drum changed the position of one end of the cable relative to the other end of the cable, thereby causing the motor to pivot and to steer the vessel. This steering system was commonly referred to as a cable/pulley system.

This steering system remained virtually unimproved for many years and performed satisfactorily in service with only minor maintenance. As motor horsepower continued to increase, it became apparent that the cable/pulley system would no longer provide satisfactory results.

The next innovation in steering systems was to provide a steering wheel affixed to a helm unit which converts the rotary steering action to a linear push-pull action of a cable within a cable sheath. The sheathed cable was led from the steering station to an aft motor location where the cable sheath was directed and affixed to a cable mounting tube which was an integral part of the motor mount. The cable exited from the opposite end of the cable mounting tube from the cable sheath and was linked to the outboard motor. Rotation of the steering wheel effected an extension or a retraction of the cable relative to the cable sheath, thereby effecting a pivoting action of the outboard motor. Other variations of this system were developed for outboard motors without integral cable mounting tubes. This steering system was commonly referred to as a sheathed cable system.

The sheathed cable steering system has been a substantial improvement over the cable/pulley system since the sheathed cable system offers more positive steering with less effort and requires less maintenance than the cable/pulley system.

Unfortunately, the sheathed cable steering system suffers from a serious corrosion problem whereby the extension and retraction of the cable from the cable mounting tube permits the entry of foreign materials into the cable mounting tube. Entry of corrosive materials such as seawater produces corrosion byproducts which require an increase in steering effort to overcome the increased friction between the cable and the cable mounting tube. Ultimately, seizure of the cable within the cable mounting tube will occur unless the problem is addressed. The recommendations of the manufacturers call for the application of grease on the surface of the cable external to the cable mounting tube in an effort to introduce lubrication into the interior of the cable mounting tube. This lubrication scheme has met with little success.

Therefore, it is an object of the present invention to provide an improved system for introducing a lubricant into a cable mounting tube of a pivotable outboard motor in response to a motorboat steering device.

Another object of this invention is to provide an improved system for introducing a lubricant into a cable mounting tube of a pivotable outboard motor wherein a resilient seal ring is disposed in a recess of a nut body affixed to the cable mounting tube creates a seal between the nut body and the inner cable to prevent intrusion of foreign matter into the cable bore and cable mounting tube.

Another object of this invention is to provide an improved system for introducing a lubricant into a cable mounting tube of a pivotable outboard motor wherein a grease fitting disposed in a nut body affixed to the cable mounting tube enables the introduction of the lubricant into the cable bore and cable mounting tube.

Another object of this invention is to provide an improved system for introducing a lubricant into a cable mounting tube of a pivotable outboard motor wherein the improved system may be installed on an existing sheathed cable steering system.

Another object of this invention is to provide an improved system for introducing a lubricant into a cable mounting tube of a pivotable outboard motor wherein the improved system may be installed on an existing sheathed cable steering system without the need for specialized tools or specialized skills.

Another object of this invention is to provide an improved system for introducing a lubricant into a cable mounting tube of a pivotable outboard motor which provides a low cost solution for the introduction of the lubricant into the cable bore and cable mounting tube.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved method and apparatus for introducing a lubricant into a cable mounting tube of an outboard motor. The outboard motor is pivotable to responds to a motorboat steering device. The motorboat steering device comprises an inner cable which is linearly movable within an outer sheath with the outer sheath having a sheath nut for threadably affixing to a threaded entrance end of the cable mounting tube. A distal end of the inner cable extending from a threaded exit end of the cable mounting tube is connected to the outboard motor for pivoting the outboard motor in response to the motorboat steering device. The improvement comprises a nut body having an end wall with a threaded bore only partially extending through the nut body for threadably affixing the nut body to the threaded exit end of the cable mounting tube. A cable bore defined in the end wall of the nut body communicates with the threaded bore and supports the inner cable when the distal end of the inner cable is disposed external to the nut body. An annular recess is defined in the cable bore of the nut body and a resilient seal ring disposed in the recess creates a seal between the nut body and the inner cable to prevent intrusion of a foreign matter into the cable bore of the nut body. A grease fitting disposed in the nut body enables the introduction of the lubricant into the cable bore.

In a more specific embodiment of the invention, the end wall of the nut body is integrally formed with the nut body. An intermediate bore is interposed between the threaded bore and the cable bore. The grease fitting is disposed in the nut body proximate the intermediate bore. The threaded bore diameter is commensurate with the cable mounting tube diameter. The intermediate bore has an intermediate bore diameter being substantially equal to the threaded bore diameter.

In another embodiment of the invention, the annular recess has a substantially square cross section with the resilient seal ring disposed in the annular recess. The resilient seal ring has a substantially square U-shaped cross section defining an outer annular recess base and recess side walls. The resilient seal ring comprises an outer annular ring, an inner annular ring and a connecting web. The resilient seal ring is disposed in the annular recess with the outer annular ring engaging with the outer annular recess base and with the web engaging one of the annular recess side walls. The inner annular ring of the resilient seal ring extends from the annular recess into the cable bore enabling the lubricant introduced into the cable bore to deform the inner annular ring into engagement with the inner cable for creating a seal between the nut body and the inner cable to prevent intrusion of a foreign matter into the cable bore of the nut body.

In another embodiment of the invention, an adapter nut body, having a threaded bore only partially extending through the adapter nut body is provided for threadably affixing the adapter nut body to the threaded entrance end of the cable mounting tube. A cable bore only partially extending through the adapter nut body communicates with said threaded bore. An externally threaded tube is disposed proximate the cable bore for threadably affixing the adapter nut body to the sheath nut of the outer sheath. A grease fitting disposed in the adapter nut body enables the introduction of the lubricant into the cable bore.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
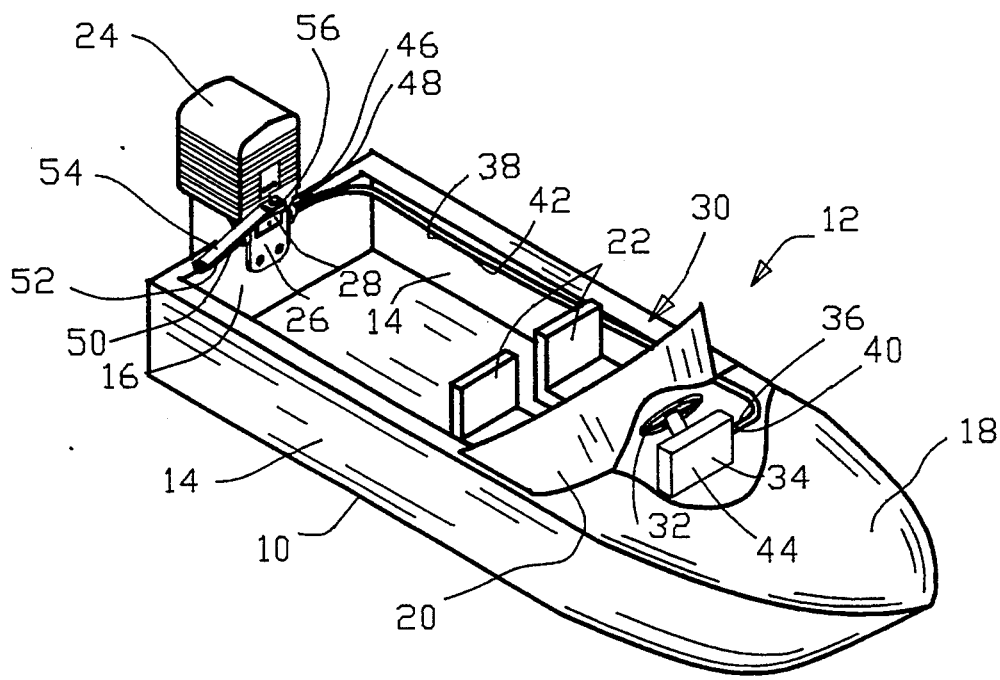
FIG. 1 is an isometric view of an outboard motorboat including an installed sheathed cable steering system.
Figure 2:
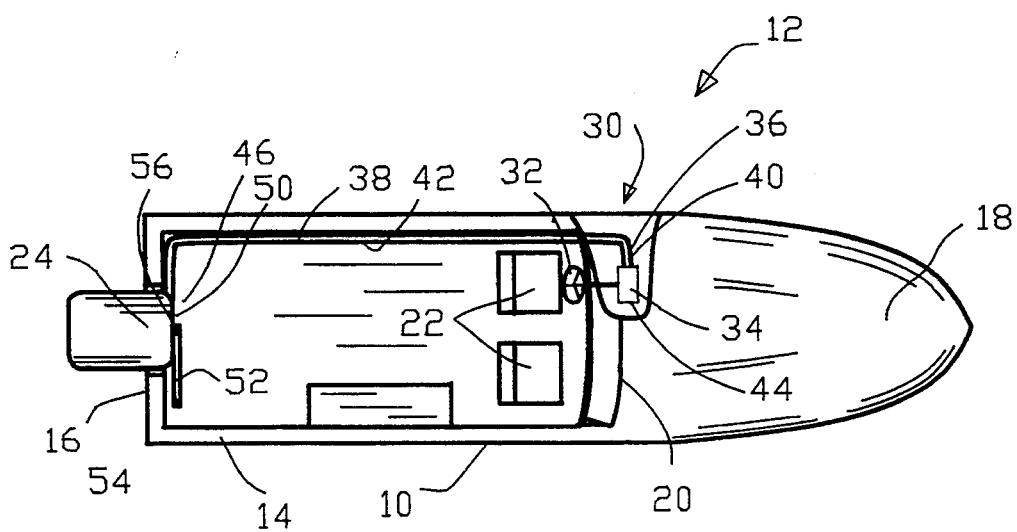
FIG. 2 is a plan view of the outboard motorboat of FIG. 1.
Figure 3:
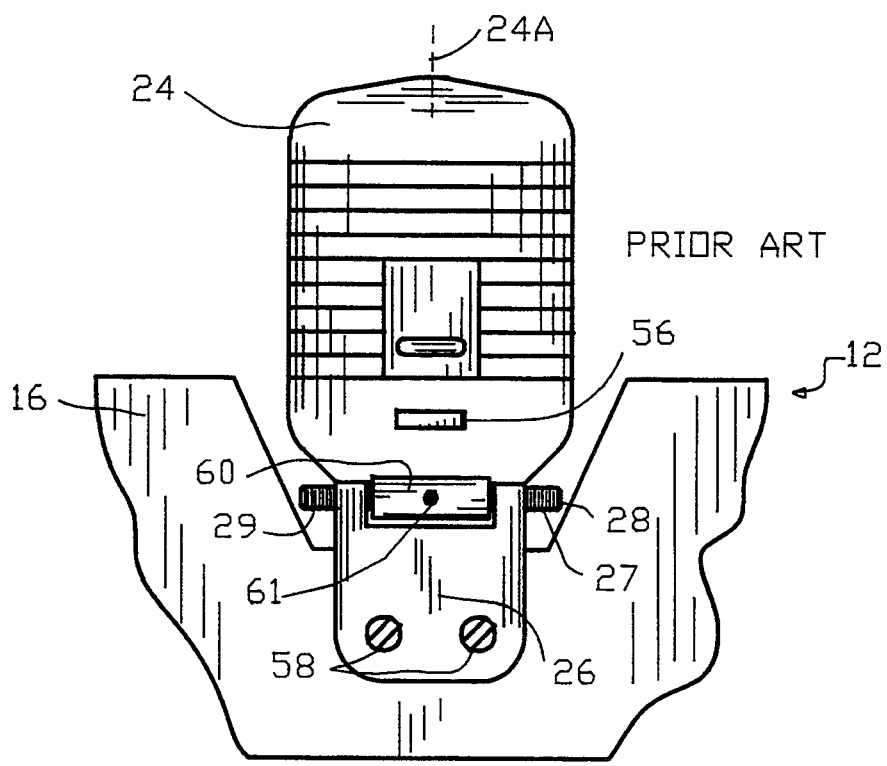
FIG. 3 is an elevation view of the interior transom of an outboard motorboat of FIGS. 1 and 2.
Figure 4:
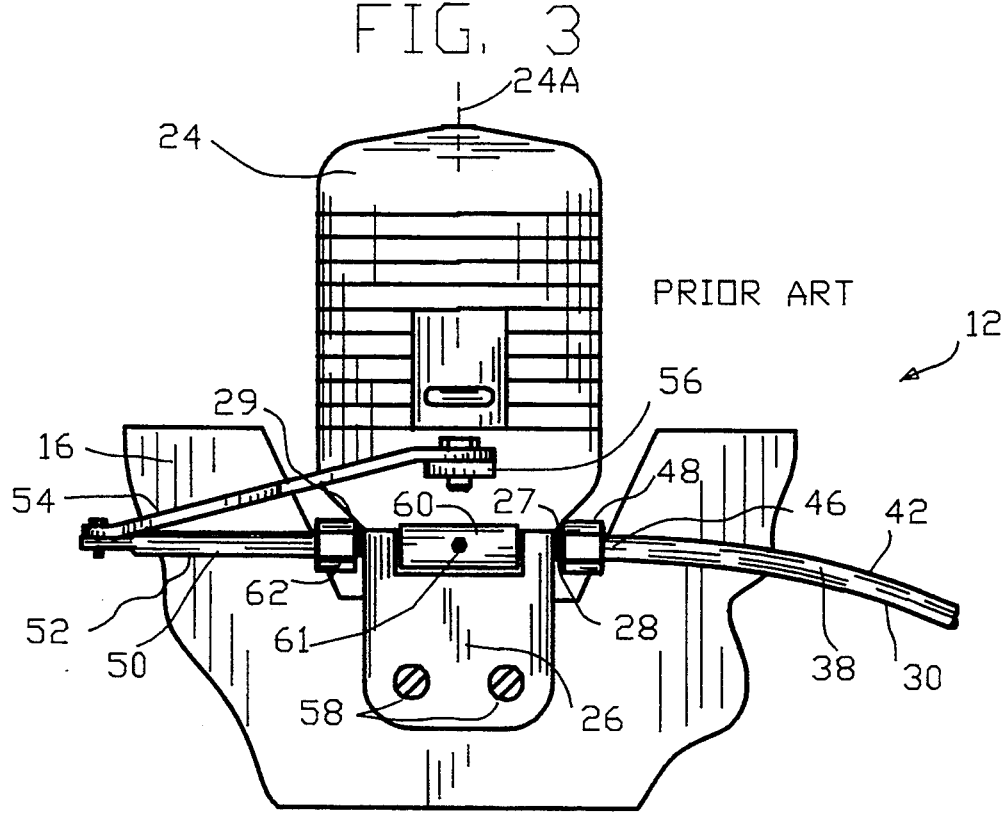
FIG. 4 is an elevation view of the interior transom of an outboard motorboat of FIG. 3 a sheathed cable steering system installed on the outboard motor.

FIGS. 1 and 2 are isometric and plan views of an outboard motorboat 12 including a hull 10, sides 14 and a transom 16. A deck 18 is affixed to the hull 10 with a windshield 20 mounted on the deck 18. Seats 22 are mounted inside the hull 10. An outboard motor 24 is mounted on the transom 16 by way of an outboard motor mount 26. As also shown in FIGS. 3 and 4, a cable mounting tube 28 is an integral part of the outboard motor mount 26 and comprises an externally threaded entrance end 27 and an externally threaded exit end 29. The outboard motor 24 pivots about a vertical axis 24A to control the direction of the outboard motorboat 12 in response to a sheathed cable steering system 30.

The sheathed cable steering system 30 comprises a steering wheel 32 affixed to a helm unit 34. A first end 36 of an inner cable 38 is affixed to an internal mechanism (not shown) of the helm unit 34. A first end 40 of an outer sheath 42 is affixed to a case 44 of the helm unit 34. A second end 46 of the outer sheath 42 is fixed to the externally threaded entrance end 27 of the cable mounting tube 28 by means of a sheath nut 48. A second end 50 of the inner cable 38 comprises a rigid rod 52 extending through and exiting from the externally threaded exit end 29 of the cable mounting tube 28. A steering link 54 connects the rigid rod 52 to a tiller arm 56 of the outboard motor 24. A finish nut 62 is affixed to the externally threaded exit end 29 of cable mounting tube 28 opposite the connection of the outer sheath 42 and the sheath nut 48.

In operation, a clockwise rotation of the steering wheel 32 produces a linear retraction of the inner cable 38 relative to the outer sheath 42, by means of a rotational-to-linear motion conversion action of the helm unit 34. The retraction of inner cable 38 effects a retraction of the rigid rod 52 which is affixed to the second end 50 of the inner cable 38. The connection of the outboard motor 24 tiller arm 56 to the rigid rod 52 by means of the steering link 54 completes the mechanical connections required to pivot the outboard motor 24 about the vertical axis 24A in response to the actions of sheathed cable steering system 30.

FIG. 3 is an elevational view of the interior transom 16 of the outboard motorboat 12 of FIGS. 1 and 2 prior to the installation of the sheathed cable steering system 30. The outboard motor 24 is affixed to the transom 16 by means of the motor mount 26 and mounting bolts 58. The cable mounting tube 28 extends through the motor mount 26 and provides a support for a tilt hinge 60 of the outboard motor 24. The tilt hinge 60 rotates about a horizontal axis of the cable mounting tube 28 to enabling the outboard motor 24 to tilt forward as should be well known to those skilled in the art. A tilt hinge grease fitting 61 is provided for greasing the tilt hinge 60 which is external to the cable mounting tube 28.

FIG. 4 is an elevational view of the interior transom 16 of the outboard motorboat 12 of FIG. 3 after the installation of a conventional sheathed cable steering system 30 on the outboard motor 24. The second end 46 of the outer sheath 42 is affixed to the externally threaded entrance end 27 of cable mounting tube 28 by the sheath nut 48. The second end 50 of the inner cable 38 comprising the rigid rod 52 extends through and exits from the externally threaded exit end 29 of cable mounting tube 28. The steering link 54 connects the rigid rod 52 to the tiller arm 56 of the outboard motor 24. The finish nut 62 is affixed to the externally threaded exit end 29 of cable mounting tube 28 opposite the connection of the outer sheath 42 and the sheath nut 48. A rotation of the steering wheel 32 effects an extension or a retraction of the rigid rod 52 relative to the outboard motor mount 26 by means of the helm unit 34. Since the rigid rod 52 is affixed to the inner cable 38 and the motor mount 26 is affixed to the outer sheath 42 by the sheath nut 48, the linear extension or retraction of the rigid rod 52 effects a pivoting of the outboard motor 24 about the vertical pivoting axis 24A to steer the outboard motorboat 12 as should be well known to those skilled in the art.

Unfortunately, the sheathed cable steering system 30 of the prior art suffered from a serious corrosion problem since the extension and retraction of the rigid rod 52 permits the entry of foreign materials into the cable mounting tube 28. The entry of corrosive materials such as seawater produces corrosion between the inner cable 38 and the cable mounting tube 28.

Figure 5:
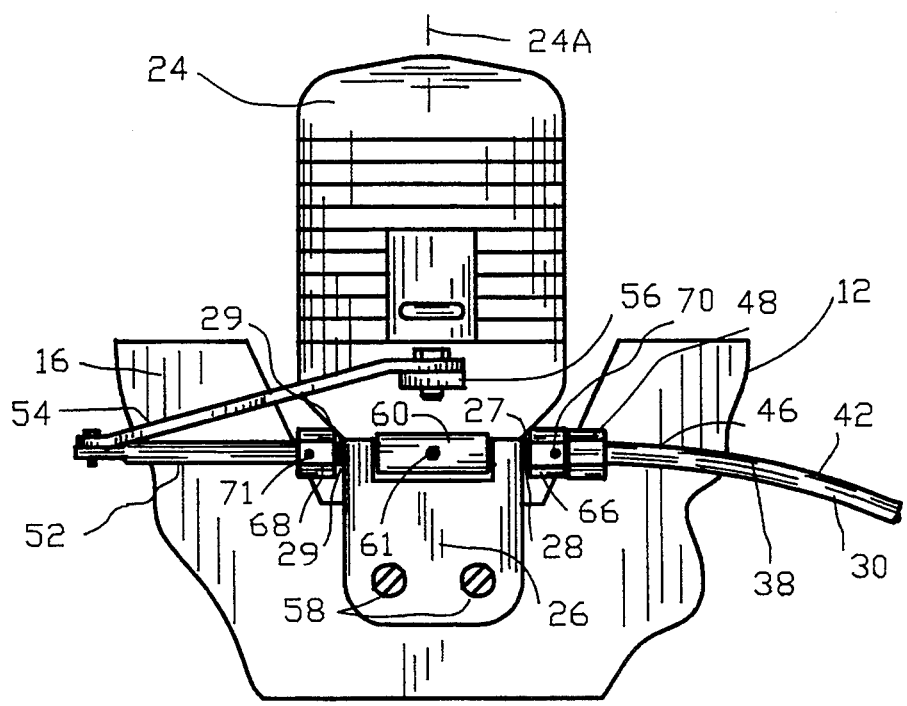
FIG. 5 is an elevation view of the interior transom of an outboard motorboat of FIG. 4 incorporating the present invention.
Figure 10:
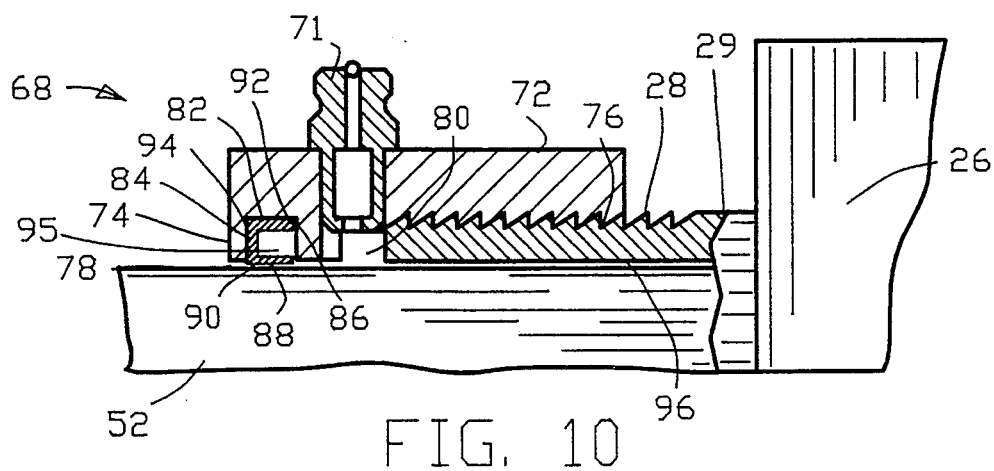
FIG. 10 is a cross sectional view of the nut body of the present invention installed on a cable mounting tube prior to the introduction of a lubricant.
Figure 11:
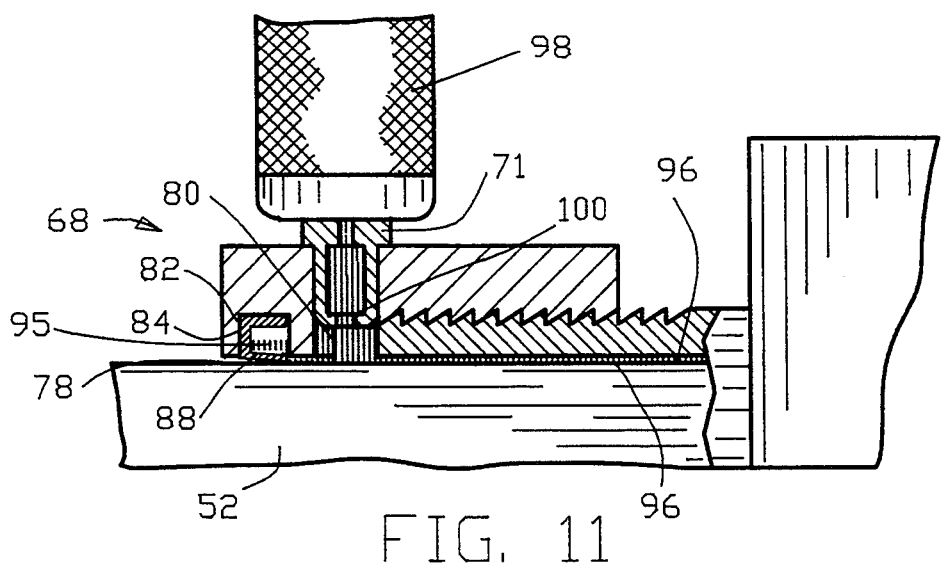
FIG. 11 is a cross sectional view of the nut body of the present invention described in FIG. 10 illustrating the initial stages of the introduction of the lubricant.
Figure 12:
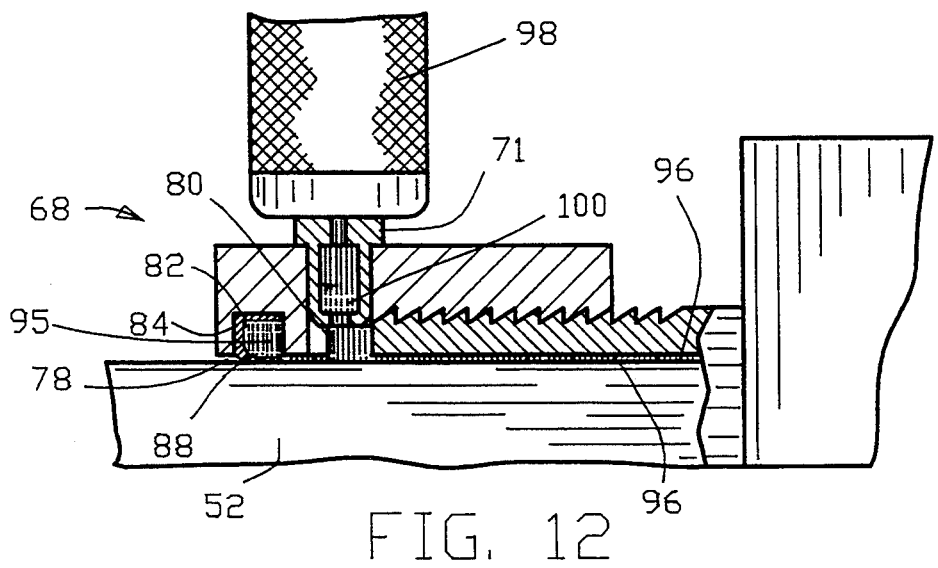
FIG. 12 is a cross sectional view of the nut body of the present invention described in FIG. 11 illustrating the completion of the introduction of the lubricant and subsequent deformation of the resilient seal ring.

FIG. 5 is an elevational view of the interior transom 16 of an outboard motorboat 12 of FIG. 4 incorporating the present invention including an adaptor nut 66 and a sealing nut 68. FIGS. 6-9 illustrate various views of the sealing nut 68 whereas FIGS. 13-16 illustrate various views of the adaptor nut 66. As best shown in FIG. 16, the second end 46 of the outer sheath 42 is threadably affixed to externally threaded tube 106 of the adaptor nut 66 by means of the sheath nut 48. The adaptor nut 66 is affixed to the externally threaded entrance end 27 of the cable mounting tube 28 by means of a threaded bore 102 of the adapter nut 66. As best shown in FIGS. 10-12, the second end 50 of inner cable 38 comprising the rigid rod 52 extends through the sealing nut 68 which is affixed to the externally threaded exit end 29 of the cable mounting tube 28 by means of the threaded bore 76 of the sealing nut 68. An important aspect of the present invention is the addition of grease fittings 70 and 71 respectively affixed to the adaptor nut 66 and the sealing nut 68 to permit the addition of a lubricant into the cable mounting tube 28.

Figure 6:
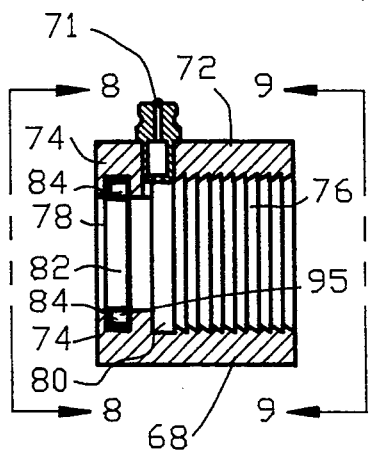
FIG. 6 is a cross sectional view of the nut body of the present invention.
Figure 8:
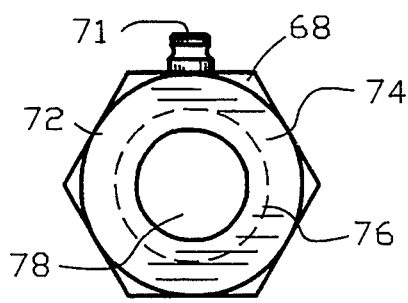
FIG. 8 is an end view along line 8—8 of FIG. 6 of the nut body.
Figure 9:
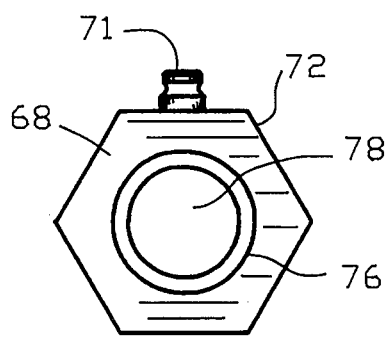
FIG. 9 is an end view along line 9—9 of FIG. 6 of the nut body.

Referring to FIGS. 6, 8 and 9, the sealing nut 68 of the present invention comprises a nut body 72 which may be constructed from a metallic material or a plastic composite material. The threaded bore 76 partially extends through nut body 72 with the diameter of threaded bore 76 being commensurate with the diameter of the externally threaded exit end 29 of cable mounting tube 28 for enabling a threaded engagement therebetween. The nut body 72 is provided with an end wall 74 which contains cable bore 78. The diameter of cable bore 78, which may support inner cable 38, is commensurate with the diameter of inner cable 38 and is substantially less than the diameter of the threaded bore 76. An intermediate bore 80 has a diameter substantially equal to the threaded bore 76 and is placed between the threaded bore 76 and the cable bore 78. The grease fitting 71 is affixed to the nut body 72 and communicates with the intermediate bore 80 allowing for the addition of a lubricant into the intermediate bore 80 and the cable bore 78.

An annular recess 82 having a substantially square cross-section is machined into the cable bore 78. A resilient seal ring 84 is placed in the annular recess 82 for providing a seal between the cable bore 78 of the nut body 72 and the inner cable 38 to prevent incursion of an external foreign matter and to retain a lubricant internal to sheathed cable steering system 30.

Figure 7:
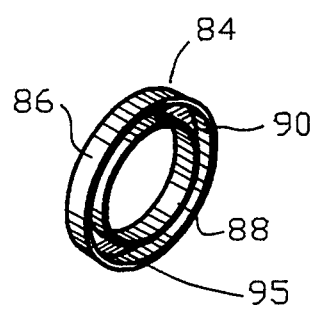
FIG. 7 is an isometric view of the resilient seal incorporated in the present invention.

FIG. 7 is a isometric view of the resilient seal ring 84 comprising an outer annular ring 86 and an inner annular ring 88 connected by a web 90. The resilient seal ring 84 has a substantially squared, U-shaped cross-section defining a grease cavity 95.

FIGS. 8 and 9 are end views along line 8—8 and line 9—9 of FIG. 6 illustrating the nut body 72, the end wall 74, the cable bore 78, the grease fitting 71 and the threaded bore 76.

FIG. 10 is a cross-sectional view of the sealing nut 68 of the present invention installed on a cable mounting tube 28 prior to the introduction of a lubricant. The sealing nut 68 comprising the nut body 72, the grease fitting 71 and the resilient seal ring 84 is illustrated with the threaded bore 76 threaded onto the externally threaded exit end 29 of the cable mounting tube 28 of the outboard motor mount 26. The rigid rod 52 extends through the cable mounting tube 28 and the sealing nut 68. The resilient seal ring 84 disposed within the annular recess 82 of cable bore 78 with the outer annular ring 86 contacting with the annular recess base 92. The web 90 of resilient seal ring 84 contacts with the recess sidewall 94 proximate the end wall 74 of the nut body 72. The inner annular ring 88 of the resilient seal ring 84 is disposed adjacent the rigid rod 52 of the inner cable 38. The cable bore 78 provides support for the rigid rod 52 of the inner cable 38. Interstices 96 are defined as the volume occupied between the rigid rod 52 and cable mounting tube 28 and the sealing nut 68.

FIG. 11 is a cross-sectional view of the sealing nut 68 of the present invention described in FIG. 10 illustrating the initial stages of the introduction of a lubricant 100 into the grease fitting 71 by a grease gun 98. The introduction of the lubricant 100 through grease fitting 71 allows the lubricant 100 to flow into and through the intermediate bore 80 and into the interstices 96. The flow of lubricant 100 into the grease cavity 95 of the resilient seal ring 84 produces a partial deformation of the inner annular ring 88. The inner annular ring 88 is deformed toward the rigid rod 52 and exerts a partial sealing force against the surface of rigid rod 52.

FIG. 12 is a cross-sectional view of sealing nut 68 of the present invention described in FIG. 11 illustrating the completion of the addition of lubricant 100 through grease fitting 71 into and through intermediate bore 80 and into the interstices 96. The flow of lubricant 100 into resilient seal ring 84 disposed within annular recess 82 produces a further deformation of the inner annular ring 88 whereby the inner annular ring 88 exerts sealing a force against the surface of rigid rod 52. The complete deformation of the inner annular ring 88 of the resilient seal ring 84 creates a substantial seal between the rigid rod 52 and the seal nut 68 whereby the further addition of the lubricant causes the lubricant to flow into the cable mounting tube 28. The further addition of the lubricant 100 causes the lubricant 100 to fill the cable mounting tube 28 and to flow into the sheath cable steering system 30. The seal between the rigid rod 52 and the seal nut 68 by the inner annular ring 88 of the resilient seal ring 84 prevents the incursion of external foreign matter to inhibit the development of corrosion of the cable mounting tube 28 and the sheathed cable steering system 30. In should be appreciated that the construction of the resilient seal ring 84 and the deformation of the inner annular ring 88 by the injected lubricant 100 establishes a positive pressure within the grease cavity 95 and within the cable mounting tube 28 and the sheathed cable steering system 30. The positive pressure within the cable mounting tube 28 and the sheathed cable steering system 30 assists in preventing the incursion of external foreign matter into the cable mounting tube 28 and the sheathed cable steering system 30.

Figure 13:
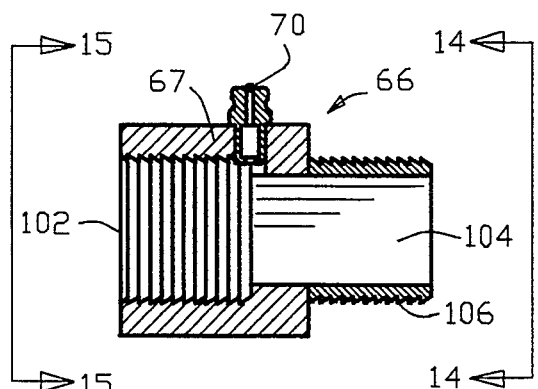
FIG. 13 is a cross sectional view of the adapter nut body of the present invention.

FIG. 13 is a cross-sectional view of the adaptor nut 66 comprising an adapter nut body 67 which may be constructed from a metallic material or a plastic composite material. A threaded bore 102 extends only partially through the adaptor nut body 67. The diameter of the threaded bore 102 is commensurate with the diameter of the externally threaded entrance end 27 of the cable mounting tube 28. A cable bore 104 extending only partially through the adaptor nut body 67 communicates with the threaded bore 102. The diameter of the cable bore 104 is commensurate with the diameter of the rigid rod 52 of the inner cable 38 and is substantially less than the threaded bore diameter 102. The grease fitting 70 affixed to the adaptor nut body 67 communicates with the cable bore 104 for introducing of the lubricant 100 into the cable bore 104. The externally threaded tube 106 has an externally threaded diameter commensurate with the internally threaded diameter of sheath nut 48 for enabling a threadable connection therebetween.

Figure 14:
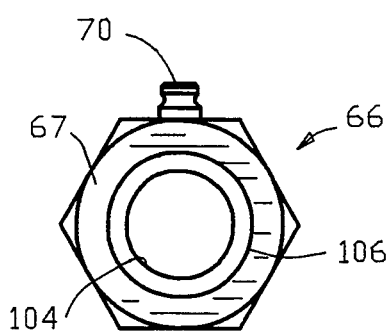
FIG. 14 is an end view along line 14—14 of FIG. 13 of the adaptor nut body.
Figure 15:
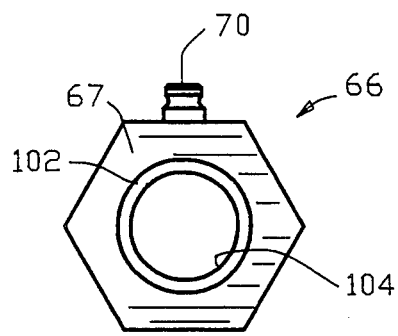
FIG. 15 is an end view along line 15—15 of FIG. 13 of the adaptor nut body.
Figure 16:
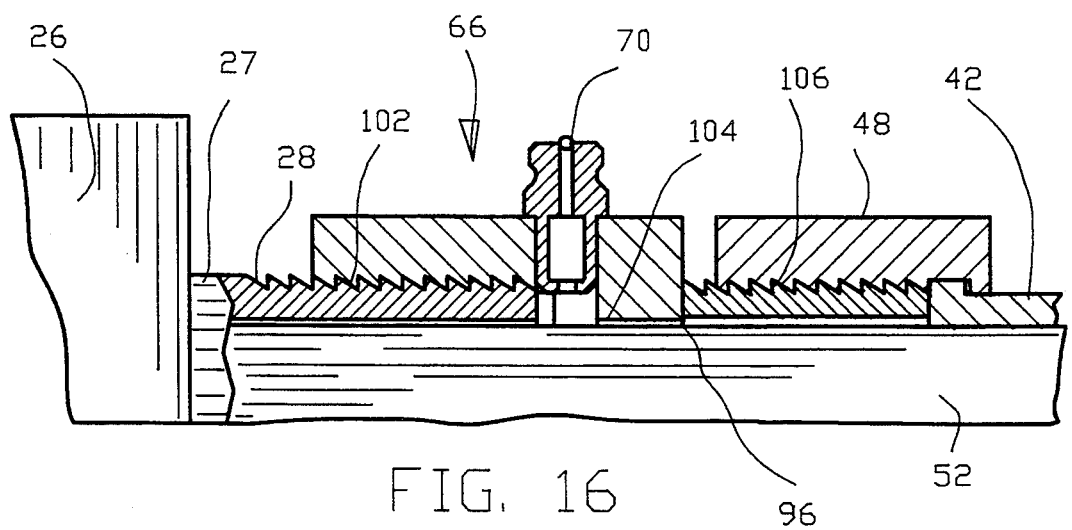
FIG. 16 is a cross sectional view of the adaptor nut body of the present invention installed on a cable mounting tube illustrating the introduction of a lubricant.

FIGS. 14 and 15 are end views along line 14—14 and line 15—15 of FIG. 13 of the adaptor nut 66 illustrating the adaptor nut body 67, the grease fitting 70, the cable bore 104 and the externally threaded tube 106.

FIG. 16 is a cross-sectional view of the adaptor nut 66 installed on the externally threaded entrance end 27 of the cable mounting tube 28 prior to the introduction of the lubricant 100. The adaptor nut 66 is threadably affixed to the externally threaded entrance end 27 of the cable mounting tube 28 proximate the outboard motor mount 26. The threaded bore 102 communicates with the externally threaded entrance end 27 of the cable mounting tube 28. The sheath nut 48 is removably affixed to the adaptor nut 66 by means of the externally threaded tube 106 of the adapter nut 66. The outer sheath 42 is likewise affixed to the adaptor nut 66 by means of the sheath nut 48. Interstices 97 are defined as a volume between the surface of the rigid rod 52 and the surface of cable mounting tube 28.

The introduction of the lubricant 100 through grease fitting 70 allows lubricant 100 to flow into and through the cable bore 104 and into the interstices 97. The flow of lubricant 100 continues through the cable bore 104 into the cable mounting tube 28. The further addition of the lubricant 100 causes the lubricant 100 to fill the cable mounting tube 28 and to flow into the sheath cable steering system 30. Since the adapter nut 66 is void of any seal similar to the resilient seal ring 84, the lubricant 100 may flow either into the cable mounting tube 28 or flow into the sheath cable steering system 30.

The present invention provides a means for filling the cable mounting tube 28 with the lubricate 100 to prevent the incursion of external foreign matter thereby inhibiting the development of corrosion of the cable mounting tube 28 and the sheathed cable steering system 30.

The improved system of the present invention may be installed on an existing sheathed cable steering system without the need for specialized tools or specialized skills. The present invention provides a low cost solution for the introduction of the lubricant into the cable bore and cable mounting tube.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A system for introducing a lubricant into a cable mounting tube of an outboard motor, the outboard motor being pivotable in response to a motorboat steering device, the motorboat steering device comprising an inner cable being linearly movable within an outer sheath with the outer sheath having a sheath nut for threadably affixing to a threaded entrance end of the cable mounting tube when a distal end of the inner cable extends from a threaded exit end of the cable mounting tube, the distal end of the inner cable being connected for pivoting the outboard motor in response to the motorboat steering device:

the improvements comprising:
  1. a sealing nut having a nut body;
  2. said nut body having an end wall;
  3. a threaded bore only partially extending through said nut body for threadably affixing said nut body to the threaded exit end of the cable mounting tube;
  4. a cable bore defined in said end wall of said nut body and communicating with said threaded bore;
  5. said cable bore supporting the inner cable when the distal end of the inner cable is disposed external said nut body;
  6. an annular recess defined in said cable bore of said nut body;
  7. a resilient seal ring disposed in said recess for creating a seal between said nut body and the inner cable to prevent intrusion of a foreign matter into said cable bore of said nut body;
  8. a grease fitting disposed in said nut body for enabling the introduction of the lubricant into said cable bore;
  9. an intermediate bore interposed between said threaded bore and said cable bore of said nut body and said grease fitting being disposed in said nut body proximate said intermediate bore;
  10. an adapter nut;
  11. said adapter nut having an adapter nut body;
  12. a threaded bore only partially extending through said adapter nut body for threadably affixing said adapter nut body to the threaded entrance end of the cable mounting tube;
  13. a cable bore only partially extending through said adapter nut body and communicating with said threaded bore;
  14. an externally threaded tube disposed proximate said cable bore for threadably affixing said adapter nut body to the sheath nut of the outer sheath; and
  15. a grease fitting disposed in said adapter nut body for enabling the introduction of the lubricant into said cable bore.

2. A system for introducing a lubricant as set forth in claim 1 wherein said end wall of said nut body is integrally formed with said nut body.

3. A system for introducing a lubricant as set forth in claim 1 wherein said threaded bore of said nut body has a threaded bore diameter commensurate with a cable mounting tube diameter of the cable mounting tube and said cable bore diameter being substantially less than said threaded bore diameter.

4. A system for introducing a lubricant as set forth in claim 1 wherein said annular recess in said cable bore of said nut body has a substantially square cross-section and said resilient seal ring having a substantially square U-shaped cross-section.

5. A system for introducing a lubricant as set forth in claim 1 wherein said threaded bore of said adapter nut body has a threaded bore a diameter commensurate with a cable mounting tube diameter of the cable mounting tube and said cable bore of said adapter nut body having a cable bore diameter being commensurate with a diameter of the inner cable and said cable bore diameter being substantially less than said threaded bore diameter.

6. A system for introducing a lubricant into a cable mounting tube of an outboard motor, the outboard motor being pivotable in response to a motorboat steering device, the motorboat steering device comprising an inner cable being linearly movable within an outer sheath with the outer sheath having a sheath nut for threadably affixing to a threaded entrance end of the cable mounting tube when a distal end of the inner cable extends from a threaded exit end of the cable mounting tube, the distal end of the inner cable being connected for pivoting the outboard motor in response to the motorboat steering device:

the improvements comprising:
  1. a sealing nut having a nut body;
  2. said nut body having an end wall;
  3. a threaded bore only partially extending through said nut body for threadably affixing said nut body to the threaded exit end of the cable mounting tube;
  4. a cable bore defined in said end wall of said nut body and communicating with said threaded bore;
  5. said cable bore supporting the inner cable when the distal end of the inner cable is disposed external said nut body;
  6. an annular recess defined in said cable bore of said nut body;
  7. a resilient seal ring disposed in said recess for creating a seal between said nut body and the inner cable to prevent intrusion of a foreign matter into said cable bore of said nut body;
  8. a grease fitting disposed in said nut body for enabling the introduction of the lubricant into said cable bore;
  9. said threaded bore of said nut body has a threaded bore diameter commensurate with a cable mounting tube diameter of the cable mounting tube and said nut body having an intermediate bore interposed between said threaded bore and said cable bore, said intermediate bore having an intermediate bore diameter being substantially equal to said threaded bore diameter and said grease fitting being disposed in said nut body proximate said intermediate bore;
  10. an adapter nut;
  11. said adapter nut having an adapter nut body;
  12. a threaded bore only partially extending through said adapter nut body for threadably affixing said adapter nut body to the threaded entrance end of the cable mounting tube;
  13. a cable bore only partially extending through said adapter nut body and communicating with said threaded bore;

14. an externally threaded tube disposed proximate said cable bore for threadably affixing said adapter nut body to the sheath nut of the outer sheath; and
15. a grease fitting disposed in said adapter nut body for enabling the introduction of the lubricant into said cable bore.

7. A system for introducing a lubricant as set forth in claim 6 wherein said end wall of said nut body is integrally formed with said nut body.

8. A system for introducing a lubricant as set forth in claim 6 wherein said annular recess in said cable bore of said nut body has a substantially square cross-section and said resilient seal ring having a substantially square U-shaped cross-section.

9. A system for introducing a lubricant as set forth in claim 6 wherein said resilient seal ring comprises an outer annular ring, an inner annular ring and a connecting web, and said outer annular ring of said resilient seal ring being disposed in said annular recess of said nut body with said inner annular ring extending from said annular recess into said cable bore enabling the lubricant introduced into said cable bore to deform said inner annular ring into engagement with the inner cable.

10. A system for introducing a lubricant into a cable mounting tube of an outboard motor, the outboard motor being pivotable in response to a motorboat steering device, the motorboat steering device comprising an inner cable being linearly movable within an outer sheath with the outer sheath having a sheath nut for threadably affixing to a threaded entrance end of the cable mounting tube when a distal end of the inner cable extends from a threaded exit end of the cable mounting tube, the distal end of the inner cable being connected for pivoting the outboard motor in response to the motorboat steering device:

the improvements comprising:
1. a sealing nut having a nut body;
2. said nut body having an end wall;
3. a threaded bore only partially extending through said nut body for threadably affixing said nut body to the threaded exit end of the cable mounting tube;
4. a cable bore defined in said end wall of said nut body and communicating with said threaded bore;
5. said cable bore supporting the inner cable when the distal end of the inner cable is disposed external said nut body;
6. an annular recess defined in said cable bore of said nut body;
7. a resilient seal ring disposed in said recess for creating a seal between said nut body and the inner cable to prevent intrusion of a foreign matter into said cable bore of said nut body;
8. a grease fitting disposed in said nut body for enabling the introduction of the lubricant into said cable bore;
9. said resilient seal ring comprises an outer annular ring, an inner annular ring and a connecting web, and said outer annular ring of said resilient seal ring being disposed in said annular recess of said nut body with said inner annular ring extending from said annular recess into said cable bore enabling the lubricant introduced into said cable bore to deform said inner annular ring into engagement with the inner cable;
10. an adapter nut;
11. said adapter nut having an adapter nut body;
12. a threaded bore only partially extending through said adapter nut body for threadably affixing said adapter nut body to the threaded entrance end of the cable mounting tube;
13. a cable bore only partially extending through said adapter nut body and communicating with said threaded bore;
14. an externally threaded tube disposed proximate said cable bore for threadably affixing said adapter nut body to the sheath nut of the outer sheath; and
15. a grease fitting disposed in said adapter nut body for enabling the introduction of the lubricant into said cable bore.

11. A system for introducing a lubricant as set forth in claim 10 including an intermediate bore interposed between said threaded bore and said cable bore of said nut body and said grease fitting being disposed in said nut body proximate said intermediate bore.

12. A system for introducing a lubricant as set forth in claim 10 wherein said threaded bore of said nut body has a threaded bore diameter commensurate with a cable mounting tube diameter of the cable mounting tube and said nut body having an intermediate bore interposed between said threaded bore and said cable bore, said intermediate bore having an intermediate bore diameter being substantially equal to said threaded bore diameter and said grease fitting being disposed in said nut body proximate said intermediate bore.

13. A system for introducing a lubricant as set forth in claim 10 wherein said annular recess in said cable bore of said nut body has a substantially square cross-section and said resilient seal ring having a substantially square U-shaped cross-section.

14. A system for introducing a lubricant into a cable mounting tube of an outboard motor, the outboard motor being pivotable in response to a motorboat steering device, the motorboat steering device comprising an inner cable being linearly movable within an outer sheath with the outer sheath having a sheath nut for threadably affixing to a threaded entrance end of the cable mounting tube when a distal end of the inner cable extends from a threaded exit end of the cable mounting tube, the distal end of the inner cable being connected for pivoting the outboard motor in response to the motorboat steering device:

the improvements comprising:
1. a sealing nut having a nut body;
2. said nut body having an end wall;
3. a threaded bore only partially extending through said nut body for threadably affixing said nut body to the threaded exit end of the cable mounting tube;
4. a cable bore defined in said end wall of said nut body and communicating with said threaded bore;
5. said cable bore supporting the inner cable when the distal end of the inner cable is disposed external said nut body;
6. an annular recess defined in said cable bore of said nut body;
7. a resilient seal ring disposed in said recess for creating a seal between said nut body and the inner cable to prevent intrusion of a foreign matter into said cable bore of said nut body;
8. a grease fitting disposed in said nut body for enabling the introduction of the lubricant into said cable bore;
9. said annular recess in said cable bore of said nut body has a substantially square cross-section defining an outer annular recess base and recess side walls, said resilient seal ring comprises a substantially squared U-shaped cross-section having an outer annular ring, an inner annular ring and a connecting web, said resilient seal ring being disposed in said annular recess with said outer annular ring engaging with said outer annular recess base and with said web engaging one of said recess side walls and said inner annular ring of said resilient seal ring extending from said annular recess into said cable bore enabling the lubricant introduced into said cable bore to deform said inner annular ring into engagement with the inner cable.

10. an adapter nut;
11. said adapter nut having an adapter nut body;
12. a threaded bore only partially extending through said adapter nut body for threadably affixing said adapter nut body to the threaded entrance end of the cable mounting tube;
13. a cable bore only partially extending through said adapter nut body and communicating with said threaded bore;
14. an externally threaded tube disposed proximate said cable bore for threadably affixing said adapter nut body to the sheath nut of the outer sheath; and
15. a grease fitting disposed in said adapter nut body for enabling the introduction of the lubricant into said cable bore.

* * * * *